(12) United States Patent
Borgmann

(10) Patent No.: US 8,919,409 B2
(45) Date of Patent: Dec. 30, 2014

(54) DOCKABLE CUT CLAMP AND RESTART MECHANISM FOR A FIBER PLACEMENT HEAD

(75) Inventor: Robert E. Borgmann, Maineville, OH (US)

(73) Assignee: Fives Machining Systems, Inc., Fond du Lac, WI (US)

( * ) Notice: Subject to any disclaimer, the term of this patent is extended or adjusted under 35 U.S.C. 154(b) by 394 days.

(21) Appl. No.: 13/426,116

(22) Filed: Mar. 21, 2012

(65) Prior Publication Data

US 2012/0241093 A1 Sep. 27, 2012

Related U.S. Application Data

(60) Provisional application No. 61/467,745, filed on Mar. 25, 2011.

(51) Int. Cl.
B29C 70/38 (2006.01)

(52) U.S. Cl.
CPC .................................. *B29C 70/384* (2013.01)
USPC .......................................... 156/574; 156/523

(58) Field of Classification Search
USPC .................... 156/433, 441, 523, 574
See application file for complete search history.

(56) References Cited

U.S. PATENT DOCUMENTS

| | | | | |
|---|---|---|---|---|
| 5,290,389 A | * | 3/1994 | Shupe et al. .................. | 156/425 |
| 6,968,883 B2 | * | 11/2005 | Torres Martinez ........... | 156/433 |
| 7,407,556 B2 | | 8/2008 | Oldani et al. | |
| 7,472,736 B2 | * | 1/2009 | Kisch et al. ................... | 156/433 |
| 7,926,537 B2 | | 4/2011 | Hamlyn et al. | |
| 2007/0044896 A1 | * | 3/2007 | Tingley ......................... | 156/157 |
| 2007/0226956 A1 | * | 10/2007 | Causey et al. .................. | 19/296 |
| 2009/0095410 A1 | | 4/2009 | Oldani | |
| 2010/0200168 A1 | * | 8/2010 | Oldani et al. ................. | 156/441 |

FOREIGN PATENT DOCUMENTS

WO  WO-2004/101413 A2 * 11/2004
WO      2008149004 A1    12/2008

* cited by examiner

*Primary Examiner* — Jeff Aftergut
(74) *Attorney, Agent, or Firm* — Reising Ethington P.C.

(57) ABSTRACT

A fiber placement machine has a fiber placement head and a K-axis housing that is supplied with fiber tow from a creel. The fiber placement head is mounted on the front of the K-axis housing. The fiber placement head has a compaction roller and a cut, clamp, and restart mechanism positioned adjacent to the compaction roller that receives fiber tow from the K-axis housing. A separable coupling connects the fiber placement head to the K-axis housing, whereby the fiber placement head may be disconnected from the K-axis housing for docking purposes.

11 Claims, 6 Drawing Sheets

DOCKABLE CUT CLAMP AND RESTART MECHANISM FOR A FIBER PLACEMENT HEAD

REFERENCE TO RELATED APPLICATION

This application claims the benefit of U.S. Provisional Application No. 61/467,745, filed Mar. 25, 2011, the entire contents of which are hereby incorporated by reference.

FIELD

This device relates to equipment used for an automated fiber placement process and specifically to a fiber placement system with a dockable lay up head.

BACKGROUND

Prior art automated fiber placement systems which have a dockable lay up head have certain disadvantages. These systems are designed with the creel assembly integrated with the lay-up head or integrated into the last motion axis of the manipulator. When exchanging one layup head for another, such systems require the entire creel assembly to be exchanged, and in some cases, an entire motion axis must be exchanged as well. As a result, each dockable mechanism includes the additional cost of the redundant creel assembly including tension control mechanisms, material spool chucks, motors, cables, fiber delivery components, and associated structures.

For prior art systems with the creel integrated into the last motion axis of the manipulator, the dockable mechanism includes the cost of the items above, plus the additional cost of the redundant motion axis i.e. motors, bearings, gear boxes, cables, and associated structures.

Prior art systems with the creel integrated into the lay-up head or last motion axis have large structures such as the material spools and the fiber delivery components included with the head, and this gives the head a large outer profile. The large profile limits the ability of the head to lay-up on tightly contoured and/or smaller-sized parts.

Prior art systems with the creel integrated into the lay-up head or last motion axis require the last or second-last axes of the machine to support additional large masses. The larger structure and drive components required to accommodate the larger masses cause a cascade effect, with each upstream axis needing to be more robust in order to accommodate the larger loads placed on it. The secondary effect of the increased weight is increased cost resulting from the larger motors, gearboxes, bearings and structures required throughout the machine.

In order to minimize the size of the creel assembly which is integrated into the head or last motion axis, prior art systems often utilize material spools that are smaller than the industry standard. This results in the need to interrupt production more frequently in order to replenish the material supply. Further, in order to minimize the size of the creel assembly which is integrated into the head or last motion axis, the currently available systems often limit the number of material spools to a maximum of 16 instead of the more normal 32. This results in a narrower bandwidth per course of material applied to the workpiece, thereby reducing productivity and increasing the duty cycle of the system.

It would be desirable to provide a fiber placement machine with a dockable head that does not have a creel integrated into the last motion axis of the manipulator, or into the head.

DETAILED DESCRIPTION OF THE DEVICE

Figure 1:
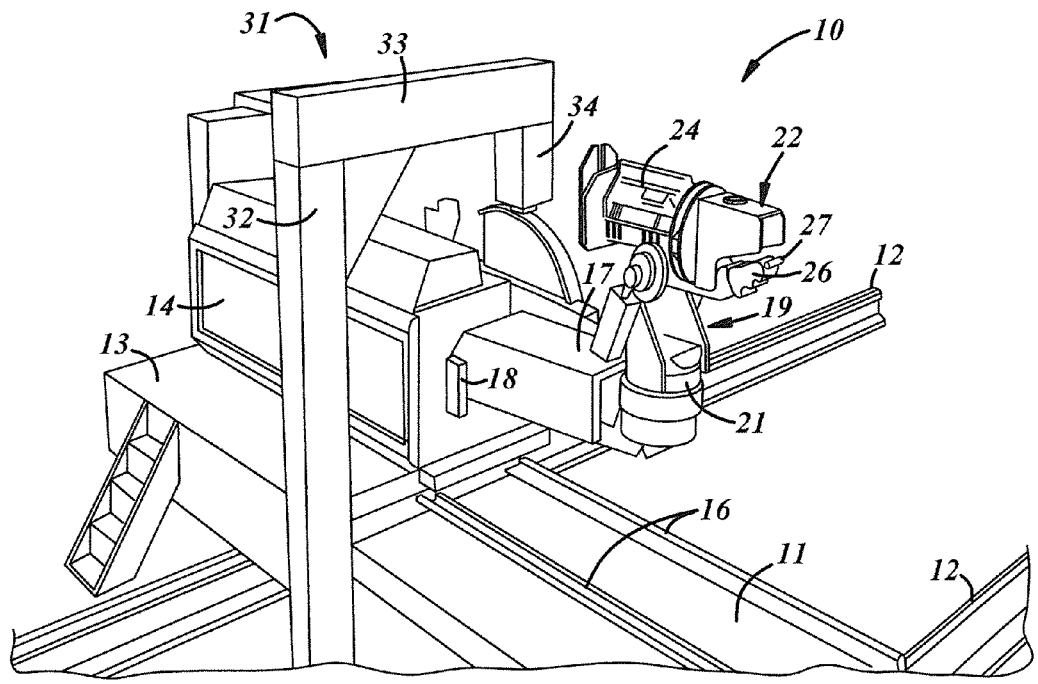
FIG. 1 is a perspective view of a fiber placement machine installation.

FIG. 1 is a perspective view of a fiber placement machine installation generally designated by the reference numeral 10. The machine comprises a carriage 11 that is mounted on rails 12 on the factory floor. A platform 13 is mounted on the carriage, and the platform supports a creel 14. The creel 14 is mounted on rails 16 so that it can travel back and forth between the rails 12. An arm 17 is coupled to the creel 14 by a pivot 18, and a wrist mechanism 19 is mounted on the end of the arm. The wrist mechanism includes a K-axis housing 24, and a fiber placement head 22 is mounted on the front of the K-axis housing 24. A cut, clamp and restart (CCR) mechanism 26 is mounted in the fiber placement head 22. A compaction device 27 such as a roller or a shoe is mounted on the end of the CCR mechanism 26. A docking station 31 comprising a vertical support post 32 and a horizontal docking beam 33 is positioned along the rails 12. A vertical suspension post 34 is mounted on the end of the docking beam 33.

Figure 2:
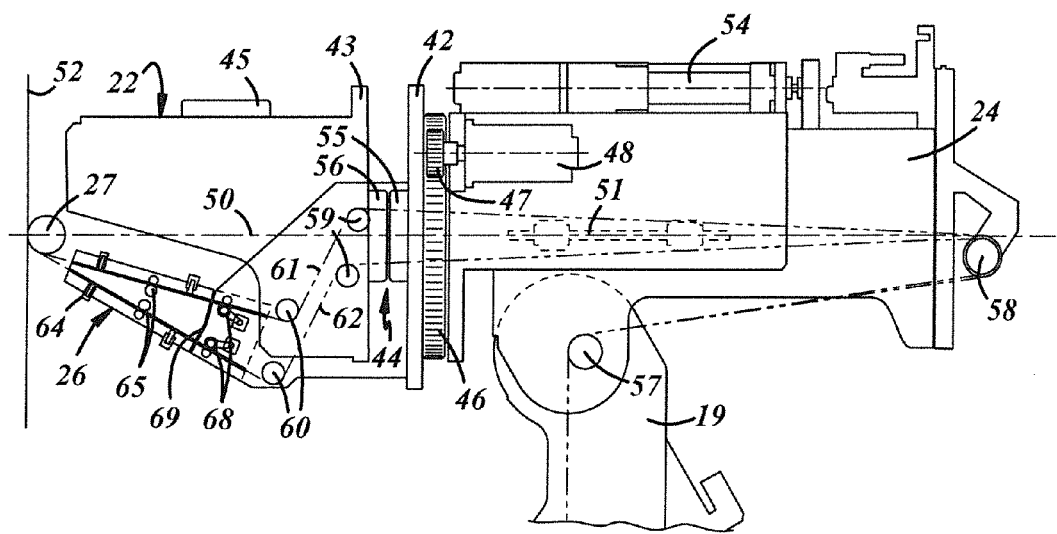
FIG. 2 is a side view of a fiber placement head and K-axis housing showing the fiber path and some of the interior components of the head and housing.

FIG. 2 is a side view of a fiber placement head 22 and the K-axis housing 24 showing the fiber path and some of the interior components. The K-axis housing 24 supports a master drive plate 42. The master drive plate 42 couples to a slave drive plate 43 on the fiber placement head 22 by means of separable couplings comprising two robot couplers 44 (only one shown) each of which comprise a master coupler 55 and a slave coupler 56. Robot couplers are commonly used to couple end effectors to a robot, and may be actuated by pneumatics. The robot couplers provide a mechanical connection to the robot as well as connecting pneumatics, hydraulics, and electrical utilities from the robot to the end effector as required. Suitable robot couplers are available from ATI Industrial Automation in Apex, N.C. A robot coupler 45 is also provided on the top surface of the CCR head assembly for docking the CCR head assembly as explained more fully below.

Figure 3:
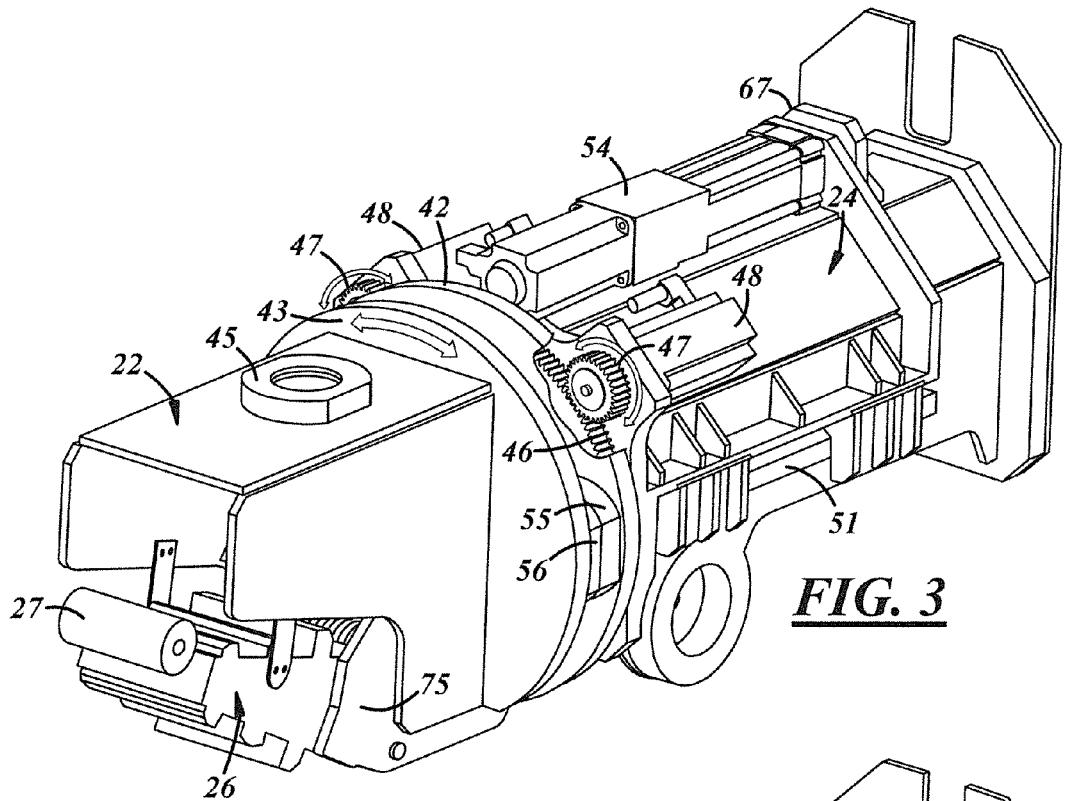
FIGS. 3 and 4 are perspective views of a fiber placement head with a cut, clamp, and restart mechanism coupled to the end of the K-axis housing.

As also shown on FIG. 3, the master drive plate 42 has a large gear 46 coupled to it, and pinion gears 47 driven by K-axis roll motors 48 engage the large gear 46 to rotate the master drive plate 42 to the desired angular orientation about the K-axis 50. In addition to being rotatably mounted on the K-axis housing 24, the master drive plate 42 is also slideably mounted on the K-axis housing 24 by means of linear guide rails 51 on either side of the K-axis housing 24 so that the master drive plate and the fiber placement head 22 including the CCR mechanism 26 and the compaction device 27 may be advanced or retracted relative to the application surface 52. A servo mechanism such as a servo driven ballscrew 54 is mounted on the K-axis housing 24 and is used to control the linear position of the master drive plate 42 and the fiber placement head 22 in order to control the force exerted by the compaction roller 27 on the application surface 52.

The fiber tow path from the wrist mechanism 19 to the compaction roller 27 includes J-axis redirect rollers 57 positioned at the J-axis pivot joint, A-axis redirect rollers 58 positioned at one end of the K-axis housing 24, K-axis redirect rollers 59 positioned at the front of the K-axis housing 24, and the CCR redirect rollers 60. The fiber tow lanes are split into odd lanes 61 and even lanes 62 through the fiber placement head and are combined at the compaction roller 27 so that they may be applied as a continuous band of fibers on the application surface 52 as well known in the art.

Cutter mechanisms 64 comprising cutter blades and actuating cylinders are mounted in the CCR mechanism 26 between restart rollers 65 and the compaction roller 27. The cutter mechanisms 64 cut the fiber tows when the fiber placement head has reached the end of a fiber path on the application surface or when the head 22 is removed from the K-axis housing 24. The cutter mechanisms 64 receive tow from the restart rollers 65 after fiber tow has been cut. Secondary restart rollers 68 feed tow to the restart rollers 65 after the fiber placement head 22 has been reattached to the K-axis housing as described in detail below. Thus, the fiber path from the CCR redirect rollers 60 to the compaction roller 27 includes the secondary restart rollers 68, the restart rollers 65, the cutter mechanism 64, and the compaction roller 27, in that order.

The secondary restart mechanism 68 can be gang-operated for the odd and even tow lanes 61,62 rather than having a separate restart mechanism for each tow lane. The restart speed of the fiber tow is not critical and as a result, smaller and lighter motors can be used in the secondary restart mechanism 68. The secondary restart mechanism 68 can also be used to retract the cut fiber ends from the CCR mechanism 26 to a position behind the break line 69 between the K-axis housing 24 and the CCR mechanism 26 so that the CCR mechanism can be docked and replaced by a different CCR mechanism as explained more fully below. Alternatively, the standard tow tensioning mechanism in the creel 14 can be used to retract the cut tow to a position behind the break line 69 between the K-axis housing 24 and CCR mechanism 26.

Figure 4:
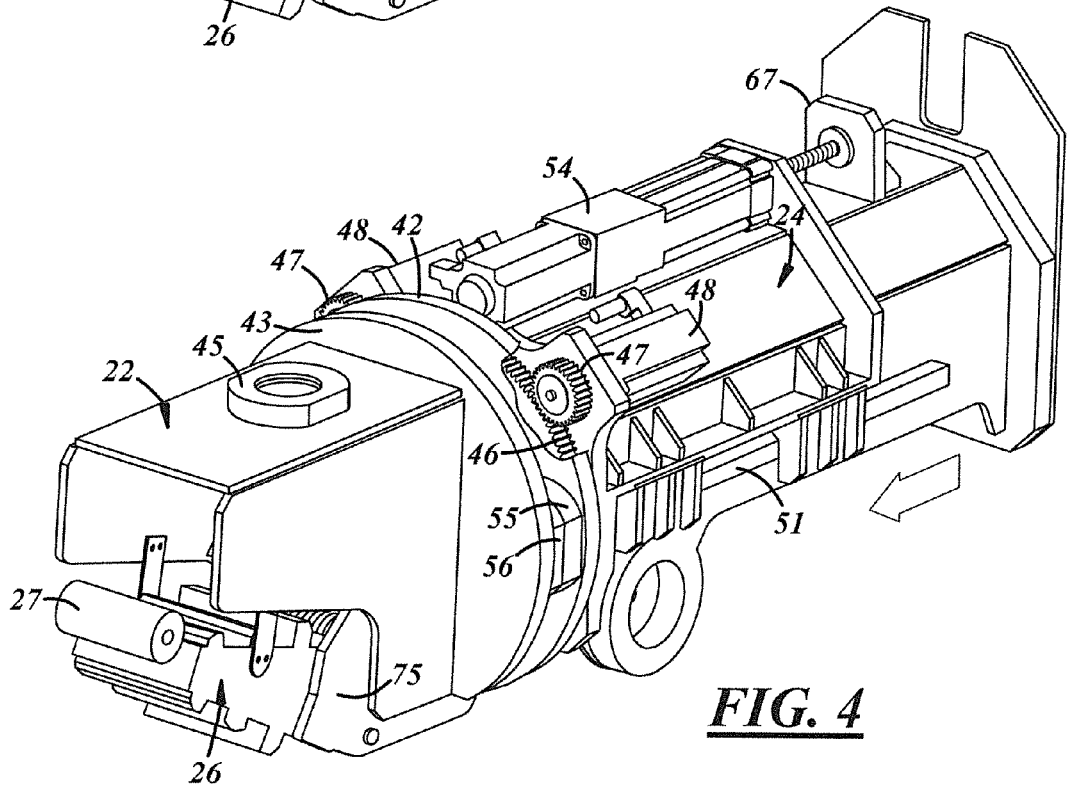

FIGS. 3 and 4 are perspective views of the K-axis housing 24 and the fiber placement head 22 that mates to it. Two K-axis roll motors 48 and pinion gears 47 are mounted on the K-axis housing 24 and are used to rotate the large ring gear 46 and the master drive plate 42 to the desired angular orientation relative to the K-axis housing. The ballscrew drive 54 for moving the master drive plate 42 toward and away from the application surface is mounted on the top of the K-axis housing 24. The linear motion of the master drive plate 42 is guided by the linear guide rails 51 (only one shown) that are located on either side of the K-axis housing 24. The top surface of the fiber placement head 22 is provided with a robot coupler 45. FIG. 3 shows the master drive plate 42 in the retracted position. FIG. 4 shows the ballscrew 54 pushing against the backstop 67 to move the drive plate 42 and the compaction roller 27 to a forward position.

Figure 5:
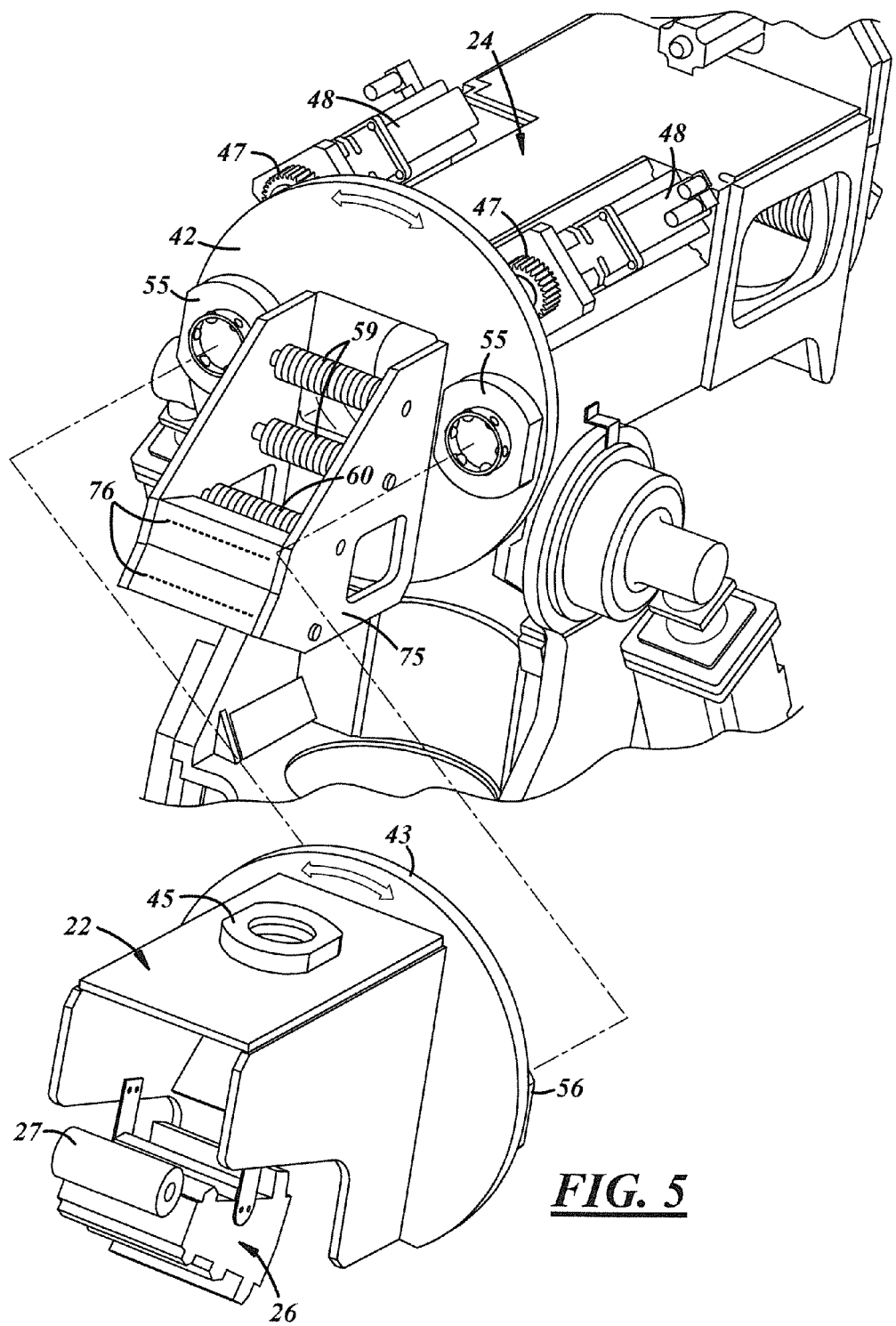
FIG. 5 is a perspective view of the fiber placement head and the cut, clamp, and restart mechanism uncoupled from the K-axis housing.

FIG. 5 is a perspective view of the fiber placement head 22 uncoupled from the K-axis housing 24. The master drive plate 42 remains attached to the K-axis housing 24, and the slave drive plate 43 is attached to the fiber placement head 22. The K-axis redirect rollers 59 and the CCR redirect rollers 60 (only one shown) remain with the K-axis housing 24. A roller frame 75 supports the K-axis redirect rollers 59 and the CCR redirect rollers 60 (only one shown), and the secondary restart rollers 68 (hidden from view). The roller frame 75 also supports guide chutes 76 for the fiber tows. The guide chutes 76 for the odd and even tow lanes are formed in front of the secondary restart rollers for guiding the tow to the CCR mechanism 26 after a new fiber placement head 22 has been coupled to the K-axis housing 24. FIG. 5 also shows the two master couplers 55 on the master drive plate 42, and the two pinion gears 47 that rotate the master drive plate 42.

Figure 6:
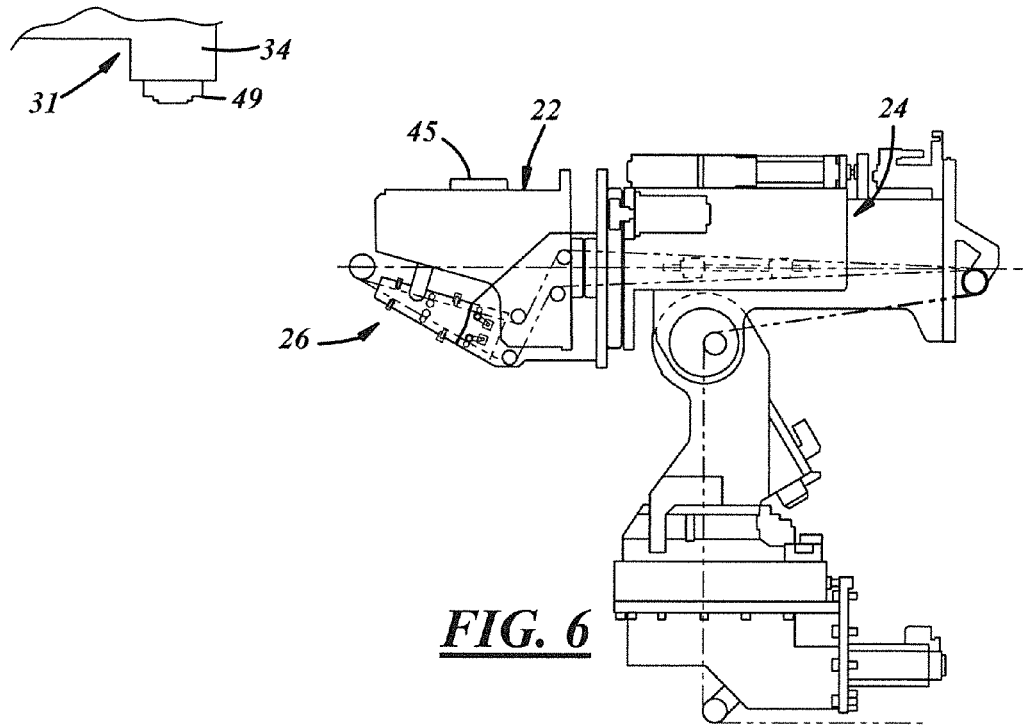
FIGS. 6 to 9 show the sequence of docking a fiber placement head at a docking station.
Figure 7:
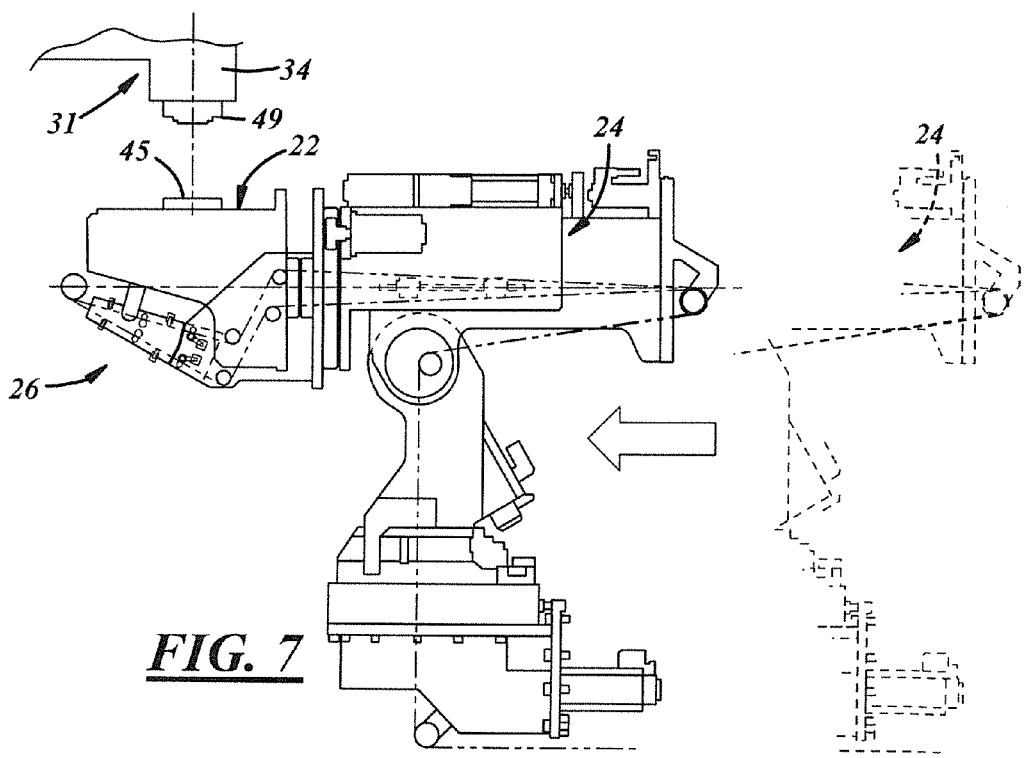

FIGS. 6 to 9 show the sequence of docking a fiber placement head 22 at a docking station 31. FIG. 6 is a side view of a K-axis housing 24 and a fiber placement head 22 spaced from a docking station 31. The top of the fiber placement head 22 is provided with a slave robot coupler 45, and the end of the suspension post 34 is provided with a mating master robot coupler 49. FIG. 7 is a side view of a fiber placement head 22 moved to a position directly under the suspension post 34 of the docking station. The master robot coupler 49 on the end of the suspension post 34 is in direct alignment with the slave robot coupler 45 on the top of the CCR head assembly 72 fiber placement head 22.

Figure 8:
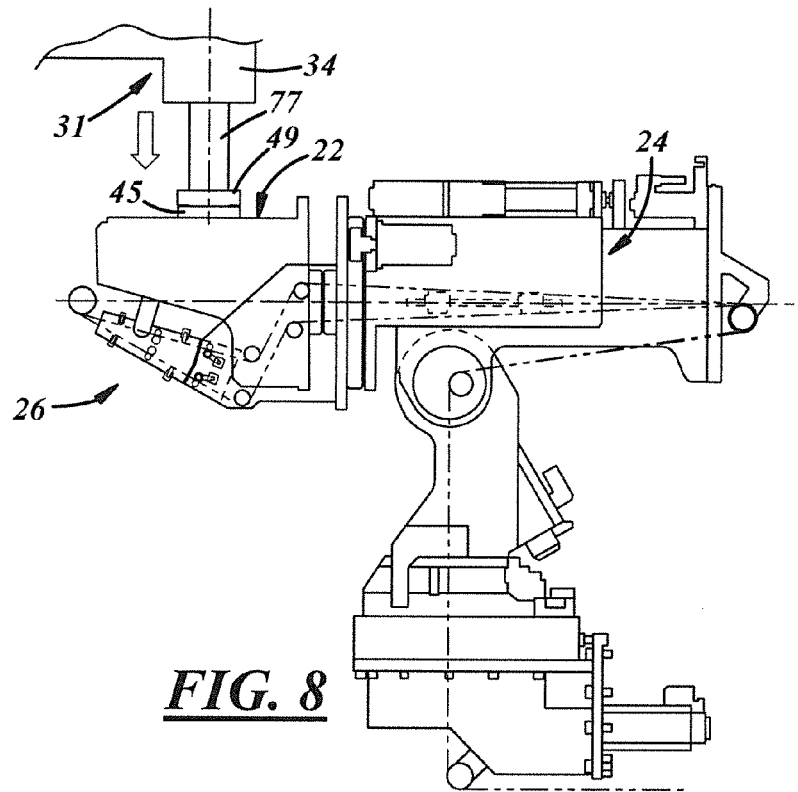
Figure 9:
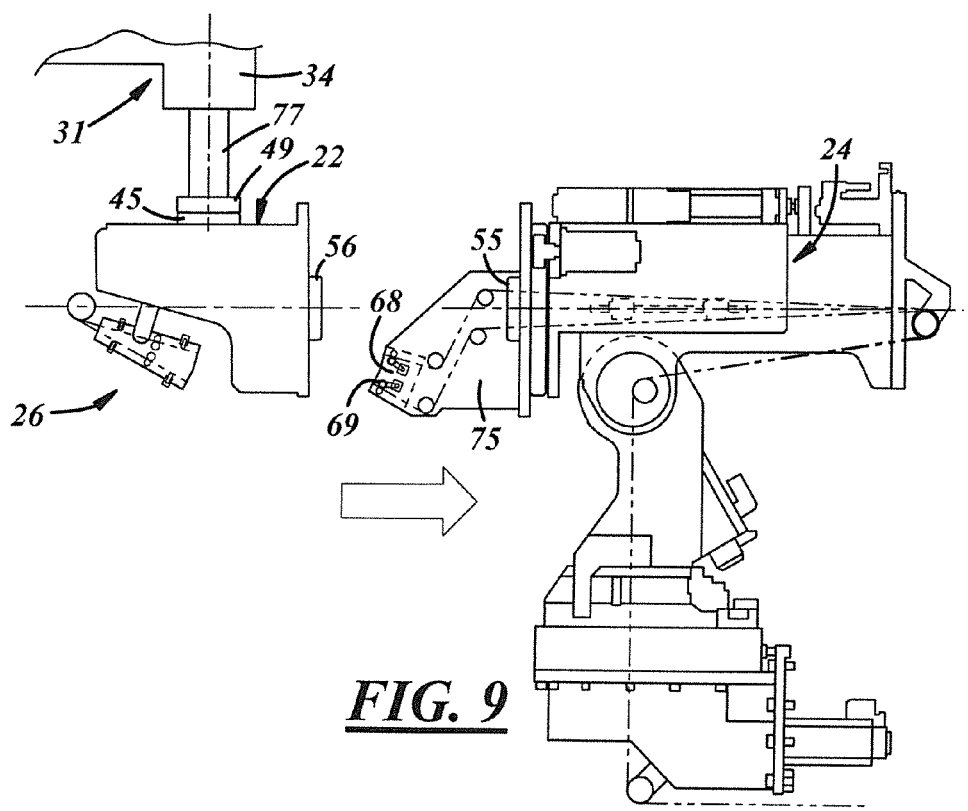

FIG. 8 is a side view of a fiber placement head 22 in contact with the master robot coupler 49 at a docking station 31. The master robot coupler 49 may be mounted on the end of a moveable post 77 coupled to an actuator that lowers the master robot coupler 49 into contact with the slave robot coupler 45 on the top of the fiber placement head 22. Alternatively, the robot coupler 49 is stationary and the fiber placement head 22 is lifted on the end of the arm 17 that supports the wrist 19 and the head 22 until the coupler 45 is in contact with the coupler 49. The master robot coupler 49 provides a mechanical connection to the slave robot coupler 45. FIG. 9 is a side view of the K-axis housing 24 spaced from a docking station 31 while the fiber placement head 22 remains coupled to the suspension post 34 at the docking station.

Figure 10:
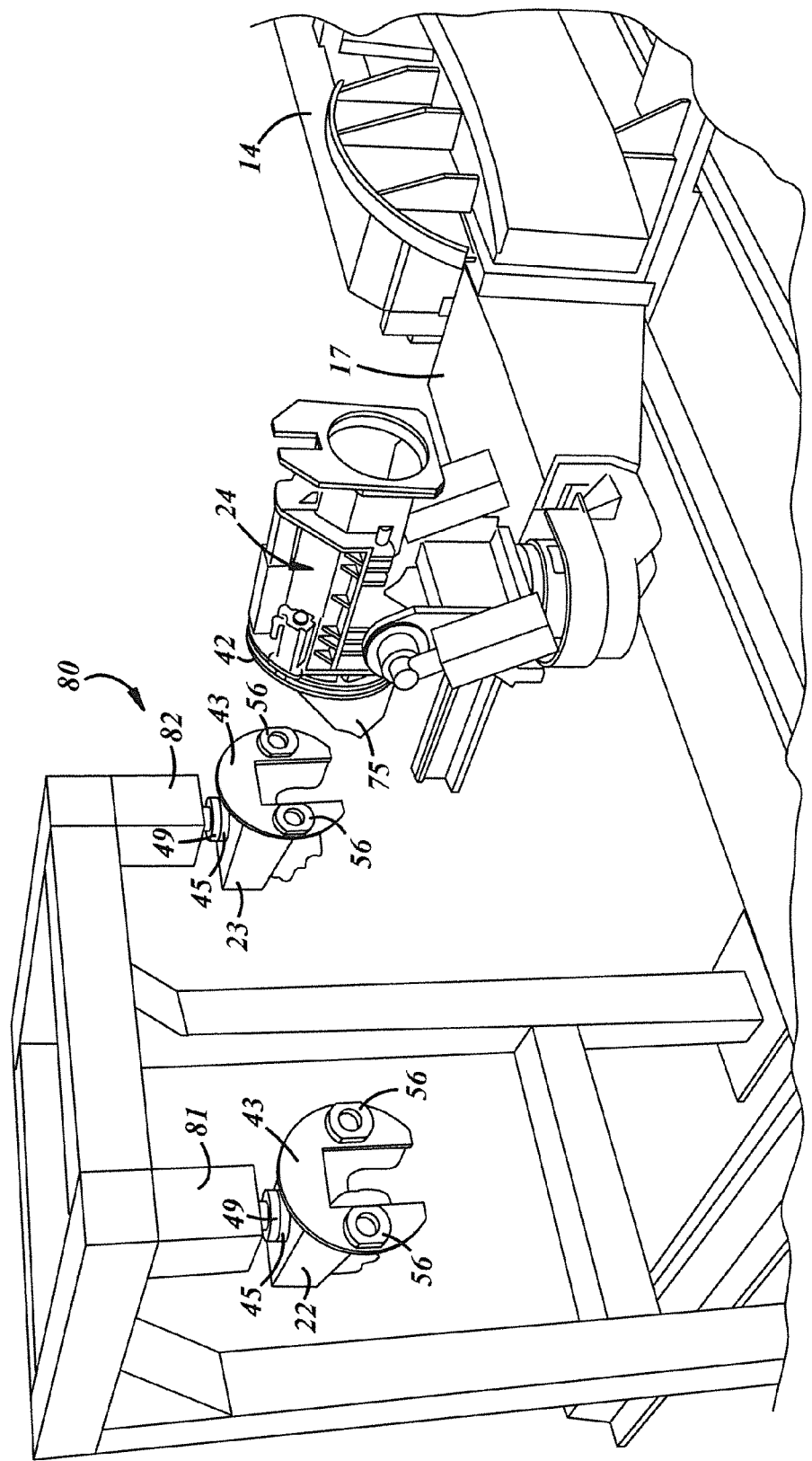
FIG. 10 is a perspective view of a docking station having the capability of docking two fiber placement heads.

FIG. 10 is a perspective view of a docking station 80 having the capability of docking two CCR head assemblies 22 and 23. The K-axis housing 24 may be maneuvered to couple to either one of the two CCR head assemblies 22 and 23. In practice, the K-axis housing 24 may use one of the CCR head assemblies 22 or 23 while the other CCR head assembly acts as a spare. When the CCR head assembly that has been in use requires maintenance or repair, the K-axis housing 24 may be maneuvered to dock the CCR head assembly that had been in use at the docking station 80, and then couple with the spare head assembly.

With reference to the CCR elements shown in FIG. 2 and the docking station 80 shown in FIG. 10, the docking sequence for the CCR head assembly is as follows:

a) The tow cutters 64 in the CCR mechanism sever the tow bands in the tow lanes 61, 62;

b) The secondary restart mechanism 68 retracts the tow material out of the CCR into the secondary restart mechanism and clamps it there;

c) The machine positions the first fiber placement head 22 such that the robot coupler 45 on the top of the first head is aligned with the robot coupler 49 on the suspension post 81;

d) The robot coupler 49 on the suspension post 81 is activated to couple with the robot coupler 45 on the first fiber placement head 22;

e) The robot couplers(s) 55 on the master drive plate 42 are released;

f) The machine retracts from the docking station, taking the K-axis housing 24 and secondary restart mechanism 68 with it and leaving the first fiber placement head 22 coupled to the suspension post 81;

g) The machine is repositioned to be aligned with the second fiber placement head 23 at the docking station 80;

h) The slave robot coupler(s) 56 connecting the second fiber placement head 23 to the K-axis housing 24 are activated;

i) The robot coupler 49 on the suspension post 82 holding the second fiber placement head 23 is released;

j) The machine retracts from the docking station 80;

k) The secondary restart mechanism 68 re-feeds the material into the CCR mechanism 26 on the second fiber placement head;

l) The tow cutters 64 perform a prep cut cycle;

m) The machine returns to production.

The device improves the productivity of a fiber placement system through the rapid, automatic docking of a fiber placement head 22. Additionally, operators are freed from heavy lifting and time-intensive head removal and installation procedures.

The present design offers a lower cost dockable mechanism because the mechanism that is docked does not include a creel. This reduces the size and weight of the dockable mechanism over those designs that include a creel with the dockable mechanism. Additionally, since the remote standard sized creel 14 is used, the machine operates with the full number of standard size spools, providing increased fiber laying throughput.

The dockable fiber placement head 22 provides increased productivity that is achieved through the capability to perform maintenance and/or repair operations on a CCR head assembly off-line, resulting in minimal interruptions to production. One fiber placement head can be taken out of service and quickly exchanged for another, thereby reducing downtime from potentially several hours to a matter of minutes.

The use of an electric servo force control for the compaction roller 27 by the ballscrew 54 and the linear guide rails 51, rather than a pneumatic mechanism, provides several advantages. The electric servo force control is more precise, allows repeatable control of compaction force, provides an opportunity to tune the damping of the compaction force, results in reduced air consumption by machine, and removes pneumatic and electrical connections that would otherwise be part of the dockable mechanism. The positioning of the servo motor 54 for the compaction roller on the K-axis housing 24 increases available volume on head, permits a tighter angle of approach for the guide chutes for the CCR mechanism, and increases mold clearance by maintaining the profile of the CCR mechanism without docking capability.

Having thus described the device, various modifications and alterations will occur to those skilled in the art, which modifications and alterations are intended to be with the scope of the invention as defined by the appended claims.

What is claimed is:

1. A fiber placement machine having a dockable fiber placement head that is supplied with fiber tow from a creel, the machine comprising:
    a K-axis housing and a fiber placement head;
    a cut, clamp, and restart (CCR) mechanism and a compaction device mounted on the fiber placement head, the CCR mechanism containing restart rollers;
    a creel for supplying fiber tow to the fiber placement head;
    an arm and a wrist coupled to the creel;
    the K-axis housing supported on the wrist and receiving fiber tow from the creel through the arm and the wrist;
    an A-axis redirect roller mounted on the back of the K-axis housing;
    K-axis redirect rollers and CCR redirect rollers mounted on the front of the K-axis housing; and,
    a separable coupling connecting the fiber placement head to the K-axis housing, whereby the fiber placement head and the CCR mechanism may be disconnected from the K-axis housing for docking purposes leaving the A-axis redirect roller, the K-axis redirect rollers, and the CCR redirect rollers with the K-axis housing and coupled to the wrist and the creel.

2. The fiber placement machine of claim 1 further comprising:
    secondary restart redirect rollers mounted on the K-axis housing for guiding the fiber tow to the cut, clamp and restart mechanism, whereby the secondary restart rollers remain with the K-axis housing when the fiber placement head is disconnected from the K-axis housing.

3. The fiber placement machine of claim 2 wherein the restart rollers in the CCR mechanism receive tow from the secondary restart rollers and feed the tow to the compaction roller when the cut clamp and restart mechanism is initially connected to the K-axis housing.

4. The fiber placement machine of claim 1 further comprising:
    a drive plate movably mounted on the K-axis housing on linear guide rails and coupled to the fiber placement head; and,
    a servo mechanism for controlling the linear position of the drive plate, whereby the position of the fiber placement head relative to an application surface and the force of the compaction roller on the application surface is controlled by the servo mechanism, the servo mechanism being mounted on the K-axis housing, whereby the servo mechanism remains with the K-axis housing when the CCR mechanism is disconnected from the K-axis housing for docking purposes.

5. The fiber placement machine of claim 1 further comprising:
    drive motors mounted on the K-axis housing for rotating the fiber placement head about the K-axis, the drive motors remaining on the K-axis housing when the fiber placement head is disconnected from the K-axis housing.

6. The fiber placement machine of claim 1 further comprising:
    the separable coupling providing a mechanical connection between the K-axis housing and the fiber placement head; and
    the separable coupling further providing connection for electrical and pneumatic utilities between the K-axis housing and the fiber placement head.

7. The fiber placement machine of claim 6 further comprising:
    robot couplers comprising the separable coupling.

8. The fiber placement machine of claim 1 further comprising:
    a docking station for the fiber placement head;
    a separable coupling on the fiber placement head and a mating separable coupling on the docking station, whereby the fiber placement head may be coupled to the docking station after being disconnected from the K-axis housing by mating the two separable couplings together.

9. The fiber placement machine of claim 1 further comprising:
    a docking station;
    at least two suspension posts at the docking station for receiving two fiber placement heads; and,
    a separable coupling on the two fiber placement heads and mating separable couplings at the docking station, whereby the two fiber placement heads may be coupled one at a time to the K-axis housing while the other fiber placement head is docked at the docking station.

10. The fiber placement machine of claim 1 further comprising:
   a compaction roller comprising the compaction device.

11. The fiber placement machine of claim 1 further comprising:
   a compaction shoe comprising the compaction device.

\* \* \* \* \*